June 13, 1939.                A. L. McGREGOR                2,162,100
                        AUTOMOBILE PROTECTIVE DEVICE
                            Filed March 18, 1937
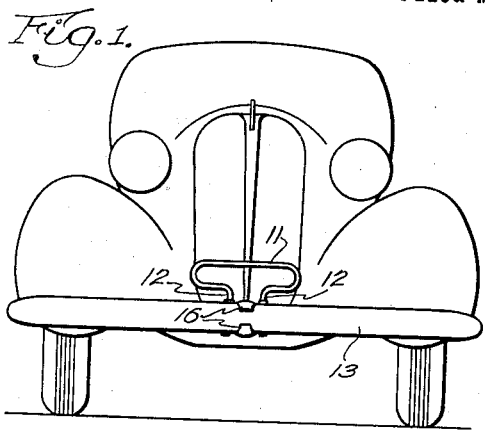
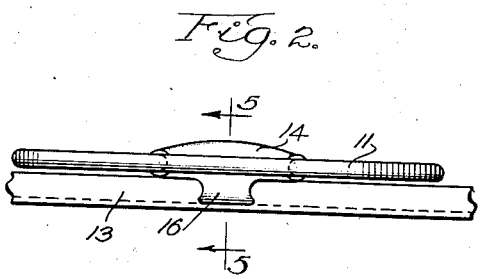
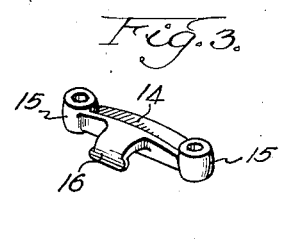
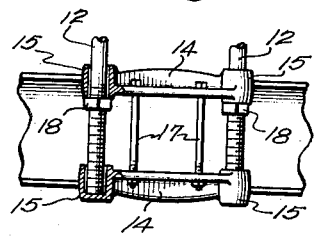
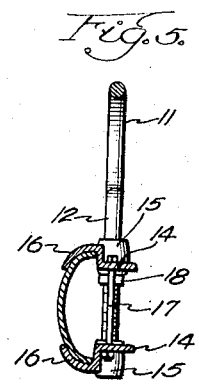
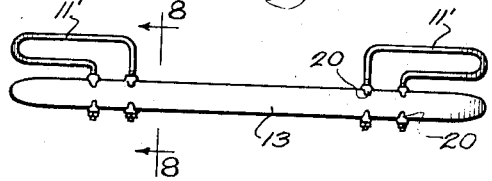
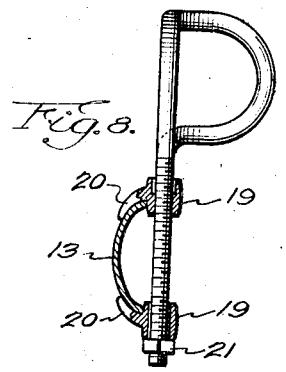
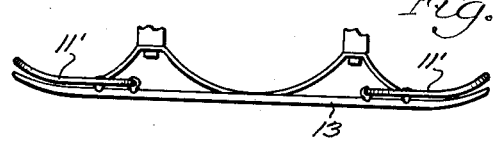
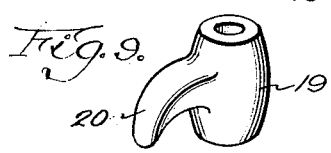
Inventor
Allan L. McGregor.
By Fisher, Clapp, Soans & Pond,
    Attys.

Patented June 13, 1939

2,162,100

UNITED STATES PATENT OFFICE 2,162,100

AUTOMOBILE PROTECTIVE DEVICE

Allan L. McGregor, Chicago, Ill.

Application March 18, 1937, Serial No. 131,551

7 Claims. (Cl. 293—55)

This invention relates to a class of automobile accessories designed to protect exposed parts of an automobile from injury by collision. The customary front and rear bumper bars serve this purpose to a limited extent, and to prevent the front bumper of one car from inter-hooking with the rear bumper of another car a practice has arisen of mounting on and crosswise of the bumper bars vertical fender members projecting above and in some cases also below the bumper bar to a sufficient extent to prevent one bar from over-riding or under-riding the other, which frequently results in an inter-hooked engagement of one bar with one end of the other, necessitating the jacking up of the front or rear end of one car to free the bars from each other. While such devices serve fairly well to prevent such inter-hooking of the bumper bars, they afford little or no protection to other exposed parts such as the lamps, the tail lights, and the modern low hung radiator and mud guards or fenders that overhang the wheels.

The main object of this invention has been to provide a novel protective accessory in the nature of a stout, rigid fender that may conveniently be mounted, preferably in multiple, on the usual bumper bar, and at such height and location as to protect the wheel mud guards, tail lights (commonly mounted on the rear mud guards), radiator and other exposed parts or accessories from injury by collision. Another object has been to provide an improved fender support that may be clamped on the bumper bar and will strongly and rigidly hold the leg or legs of the fender and lock the latter against vertical displacement; and a further object has been to provide a fender support adapted to cooperate with the fender leg or legs in securely clamping the support on the bumper bar.

Other objects and attendant advantages of the invention will be apparent to persons familiar with the art to which the invention relates from the following detailed description, taken in connection with the accompanying drawing in which I have illustrated approved embodiments of the principle of the invention, and wherein:

Fig. 1 is a front elevation of an automobile showing my improved guard applied to the center of the bumper bar, to protect the radiator.

Fig. 2 is a top plan view of the guard and of the intermediate portion of the bumper bar on an enlarged scale.

Fig. 3 is a perspective detail of the upper fender holder member.

Fig. 4 is a rear elevation, partly in vertical section, of the fender holder shown clamped on the bumper bar.

Fig. 5 is a vertical section taken on the line 5—5 of Fig. 2.

Fig. 6 is a front elevation showing a pair of guards and a modification in the form of the fenders and their holders.

Fig. 7 is a top plan view of Fig. 6.

Fig. 8 is an enlarged vertical section taken on the line 8—8 of Fig. 6, with the holder sleeves in vertical section.

Fig. 9 is a perspective view of the upper holder member of Fig. 8.

Fig. 10 is a front elevation of a further modification employing a main fender substantially coextensive lengthwise with the bumper bar, a central shorter auxiliary fender, and end and intermediate holders for the fenders.

Referring first to the form of the invention illustrated in Figs. 1 to 5 inclusive, the fender member is preferably, and as herein shown, bent to shape from a single length of ⅝" or ¾" soft steel rod stock subsequently tempered, and comprises a horizontal loop-shaped head 11 and a pair of depending legs 12.

Engaged with the legs 12 is a fender support, herein shown as designed to be mounted on the bumper bar 13. This fender support includes means for clamping it on the bumper bar and consists of upper and lower fender holders relatively inverted and each consisting of a horizontal web 14, vertical sleeves 15 at the ends of the web 14, and a central curved lip 16 on the front of the web 14 that, as most clearly shown in Fig. 5, has an overlapping fit on an edge of the bumper bar, the sleeves 15 being located just in rear of the edge. The two holders are securely united and clamped on the bumper bar by clamp bolts 17 extending through the webs thereof.

The lower ends of the sleeves 15 of the lower holder are closed, and said closed lower ends form seats for the lower ends of the fender legs 12. The lower portions of said legs are threaded, and nuts 18 on said threaded ends are screwed up against the lower ends of the sleeves 15 of the upper holder member, whereby said legs are forced downwardly into contact with the bottoms of the lower sleeves 15, and are also securely locked against vertical displacement from the support.

Figs. 6, 7, 8, and 9 illustrate the use of two fenders mounted on the end portions of the bumper bar, and a slight modification in the form of the fender, the head portion of the latter consisting of a single outwardly directed loop 11' suitably curved to conform to the transverse curvature of the wheel mud guard in front of which it is located; and also a slight modification in the fender support, this consisting in providing the two legs of each fender with independent holders which are clamped by the fender legs themselves on the bumper bar. As best illustrated in Figs. 8 and 9, the support for each leg consists simply of upper and lower sleeves 19 each of which is formed with a curved lip 20 overlapping and fitting an edge of the bumper bar. The upper holder 19 is internally threaded, and the leg of the fender is threaded, as shown in Fig. 8, so as to have screw engagement with the upper holder 19, and on the lower projecting end of the leg is a nut 21 that, when screwed up hard against the lower end of the lower sleeve 19, clamps the two holder members securely on the bumper bar. The threaded engagement of the leg with the upper sleeve also permits vertical adjustment of the height of the fender within the limits of the length of the legs. This independent mounting means for the two legs of the fender has an advantage over the mounting means shown in Fig. 4 in that it is adapted to fenders having legs of varying spread.

In Fig. 10 I have illustrated a further modification of the invention, which is designed to protect the full length of a bumper bar from being over-ridden by a colliding bar as well as protect both the radiator and the wheel mud guards. Here I provide a main fender, the head 22 of which has a spread substantially commensurate with the full length of the bumper bar with reentrant ends 22' terminating in legs 23, and an auxiliary central fender 24 of the same form or shape as the main fender, but shorter. The legs 23 of the main fender are mounted in supports identical with those above described in connection with Figs. 6 to 9 inclusive; while the legs of the central auxiliary fender 24 are preferably mounted in a support similar to that shown and described in connection with Figs. 1 to 5 inclusive. The top limbs of the two fenders are connected by a clamp 25. Obviously this construction affords more complete protection, since a colliding bumper bar cannot over-ride any portion of a bumper bar equipped as illustrated in Fig. 10.

The structural details may, of course, be varied within the scope of the appended claims.

I claim:

1. A protective device for automobiles, comprising a fender support consisting of upper and lower relatively inverted one-piece holders shaped to fit over the top and bottom edges of a bumper bar, each of said holders having vertical sleeves on its ends, means for clamping said holders on said bar, a fender member having a pair of integral vertical legs mounted in said sleeves, and means for locking said legs in said sleeves.

2. A protective device for automobiles, comprising a fender support consisting of upper and lower holders shaped to fit over the top and bottom edges of a bumper bar, said holders having vertically aligned sleeves and the sleeve on the lower holder being closed at its lower end, means for clamping said holders on said bar, a fender member having an integral threaded leg mounted in said sleeves, and a nut on said leg cooperating with the sleeve of the upper holder to lock said leg against vertical displacement.

3. A protective device for automobiles, comprising a fender support consisting of upper and lower holders shaped to fit over the top and bottom edges of a bumper bar, each of said holders having vertical sleeves on its ends and the sleeves on the lower holder being closed at their lower ends, means for clamping said holders on said bar, a fender member having a pair of integral threaded legs mounted in said sleeves, and nuts on said legs cooperating with the sleeves of the upper holder to lock said legs against vertical displacement.

4. A protective device for automobiles, comprising a fender support consisting of upper and lower holders shaped to fit over the top and bottom edges of a bumper bar, said holders having vertically aligned sleeves one of which is internally threaded, a fender member having an integral threaded leg extending through said sleeves in screw engagement with said internally threaded sleeve, and a nut on said leg cooperating with the other sleeve to clamp said holders on said bar.

5. A protective device for automobiles, comprising a fender support consisting of upper and lower holders shaped to fit over the top and bottom edges of a bumper bar, said holders having vertically aligned sleeves the upper of which is internally threaded, a fender member having an integral threaded leg extending through said sleeves in screw engagement with said upper sleeve, and a nut on the lower end of said leg cooperating with the lower sleeve to both clamp said holders on said bar and lock said leg against displacement from said sleeves.

6. A protective device for automobiles, comprising a pair of fender supports respectively attached to the end portions of a bumper bar and a third support attached to the central portion of the bumper bar, a main fender member comprising a straight rod disposed above and substantially coextensive lengthwise with the bumper bar and formed with reentrant ends terminating in legs mounted in said end supports, a shorter auxiliary one-piece fender member having legs mounted in said third support, and means connecting the top portions of said main and auxiliary fender members.

7. A protective device for automobiles, comprising a fender support consisting of upper and lower relatively inverted one-piece holders for respectively engaging with the top and bottom edges of a bumper bar, each of said holders having a horizontal web, vertical sleeves at the ends of said web, and a curved lip on the front of the web having an overlapping fit on an edge of the bumper bar, a clamp bolt uniting said webs, a fender member having a pair of legs mounted in said sleeves, and means for locking said legs in said sleeves.

ALLAN L. McGREGOR.